(12) United States Patent
DeLuca et al.

(10) Patent No.: US 8,751,955 B2
(45) Date of Patent: Jun. 10, 2014

(54) SCROLLBAR USER INTERFACE FOR MULTITOUCH DEVICES

(75) Inventors: Lisa Seacat DeLuca, San Francisco, CA (US); Travis M. Grigsby, Austin, TX (US); Frank Lawrence Jania, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 12/413,532

(22) Filed: Mar. 28, 2009

(65) Prior Publication Data

US 2010/0251167 A1 Sep. 30, 2010

(51) Int. Cl.
*G06F 3/048* (2013.01)

(52) U.S. Cl.
USPC ........... 715/786; 715/784; 715/785; 715/787; 715/815; 715/863; 715/833

(58) Field of Classification Search
USPC .................. 715/786, 798, 800, 815, 833, 863
See application file for complete search history.

(56) References Cited

U.S. PATENT DOCUMENTS

| 5,553,225 | A | * | 9/1996 | Perry ........................... | 715/786 |
|---|---|---|---|---|---|
| 5,880,722 | A | | 3/1999 | Brewer et al. | |
| 7,380,216 | B2 | | 5/2008 | Feig et al. | |
| 2006/0026535 | A1 | * | 2/2006 | Hotelling et al. ............. | 715/863 |
| 2008/0034316 | A1 | * | 2/2008 | Thoresson .................... | 715/781 |
| 2008/0165141 | A1 | * | 7/2008 | Christie ........................ | 345/173 |
| 2010/0070913 | A1 | * | 3/2010 | Murrett et al. ................ | 715/786 |

* cited by examiner

*Primary Examiner* — TuyetLien T Tran
*Assistant Examiner* — Peiyong Weng
(74) *Attorney, Agent, or Firm* — Lee Law, PLLC; Christopher B. Lee

(57) ABSTRACT

Two sliding user interactions along a display surface of a multitouch input display device are detected in approximately opposite directions proximate to a display location of a scroll element displayed on a graphical user interface (GUI) of the device. Available content displayed within the GUI is automatically zoomed based upon the detected two sliding user interactions along the display surface. This abstract is not to be considered limiting, since other embodiments may deviate from the features described in this abstract.

22 Claims, 12 Drawing Sheets

US 8,751,955 B2

SCROLLBAR USER INTERFACE FOR MULTITOUCH DEVICES

BACKGROUND OF THE INVENTION

1. Field of the Invention

The present invention relates to systems and methods for multitouch device user interfaces. More particularly, the present invention relates to a scrollbar user interface for multitouch devices.

2. Related Art

Multitouch input technologies provide opportunities for user interface design that provide sensing capabilities for locations of user contact with a display, such as with a finger or stylus. By sensing user contact locations, user interface modules may detect sliding or dragging operations initiated by the user based upon changes to the contact locations. As such, user interface applications have been designed that favor user interactions that mimic physically-oriented activities. For example, user interfaces have been designed that allow a user to flip through a series of album covers by repeatedly sliding a single finger across a display surface and that allow a user to drag a web page up and down by sliding a single finger across the display surface.

BRIEF SUMMARY OF THE INVENTION

The subject matter described herein provides a scrollbar user interface for multitouch devices. A graphical user interface (GUI) for a multitouch input display device allows a user to manipulate and mark content by performing coincident sliding actions on a display surface that resemble physical manipulations (e.g., pinching, stretching, flicking, twisting, etc.) of a scroll element. The scroll element may be a scrollbar element or other content control element. Two sliding user interactions, such as with a finger and thumb, are detected along the display surface in approximately opposite directions (e.g., pinching or stretching) near a display location of a scroll element and content is automatically zoomed within the GUI. Content is scrolled in response to detecting two user interactions in approximately similar directions near the display location of the scroll element. The scroll element may be adjusted in proportion to the automated zoom or scroll operations. Content may be marked in response to detecting flicking and twisting motions on the display surface. Accordingly, the present subject matter provides an intuitive interface for automated resizing and scrolling of content for multitouch devices.

A method includes detecting two sliding user interactions along a display surface of a multitouch input display device in approximately opposite directions proximate to a display location of a scroll element displayed on a graphical user interface (GUI) of the device; and automatically zooming available content displayed within the GUI based upon the detected two sliding user interactions along the display surface.

A system includes a multitouch input display device adapted to display visual information to a user and provide user input via user contact on a display surface; and a processor programmed to: detect two sliding user interactions along the display surface of the multitouch input display device in approximately opposite directions proximate to a display location of a scroll element displayed on a graphical user interface (GUI) of the device; and automatically zoom available content displayed within the GUI based upon the detected two sliding user interactions along the display surface.

An alternative system includes a multitouch input display device adapted to display visual information to a user and provide user input via user contact on a display surface; and a processor programmed to: detect that the user has contacted the display surface of the multitouch input display device at first and second user contact locations that each approximate a display location for one of first and second edges of a displayed scroll element respectively, displayed within a graphical user interface (GUI); detect a first and second sliding movement in approximately opposite directions, associated with the first and second user contact locations respectively, along the display surface to third and fourth user contact locations; calculate a first spacing distance between the first and second user contact locations; calculate a second spacing distance between the third and fourth user contact locations; calculate a proportional difference between the first spacing distance and the second spacing distance relative to a quantity of the available content; automatically adjust a displayed portion of available content displayed within the GUI based upon the calculated proportional difference; and automatically adjust a size of the displayed scroll element in proportion to the automated adjustment of the displayed portion of the available content displayed within the GUI.

A computer program product includes a computer useable storage medium including a computer readable program. The computer readable program when executed on a computer causes the computer to detect two sliding user interactions along a display surface of a multitouch input display device in approximately opposite directions proximate to a display location of a scroll element displayed on a graphical user interface (GUI) of the device; and automatically zoom available content displayed within the GUI based upon the detected two sliding user interactions along the display surface.

Those skilled in the art will appreciate the scope of the present invention and realize additional aspects thereof after reading the following detailed description of the preferred embodiments in association with the accompanying drawing figures.

BRIEF DESCRIPTION OF THE SEVERAL VIEWS OF THE DRAWINGS

The accompanying drawing figures incorporated in and forming a part of this specification illustrate several aspects of the invention, and together with the description serve to explain the principles of the invention.

DETAILED DESCRIPTION OF THE INVENTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides a scrollbar user interface for multitouch devices. A graphical user interface (GUI) for a multitouch input display device allows a user to manipulate and mark content by performing coincident sliding actions on a display surface that resemble physical manipulations (e.g., pinching, stretching, flicking, twisting, etc.) of a scroll element. The scroll element may be a scrollbar element or other content control element. Two sliding user interactions, such as with a finger and thumb, are detected along the display surface in approximately opposite directions (e.g., pinching or stretching) near a display location of a scroll element and content is automatically zoomed within the GUI. Content is scrolled in response to detecting two user interactions in approximately similar directions near the display location of the scroll element. The scroll element may be adjusted in proportion to the automated zoom or scroll operations. Content may be marked in response to detecting flicking and twisting motions on the display surface. Accordingly, the present subject matter provides an intuitive interface for automated resizing and scrolling of content for multitouch devices.

The scrollbar user interface for multitouch devices described herein may be performed in real time to allow prompt response to content manipulation operations. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
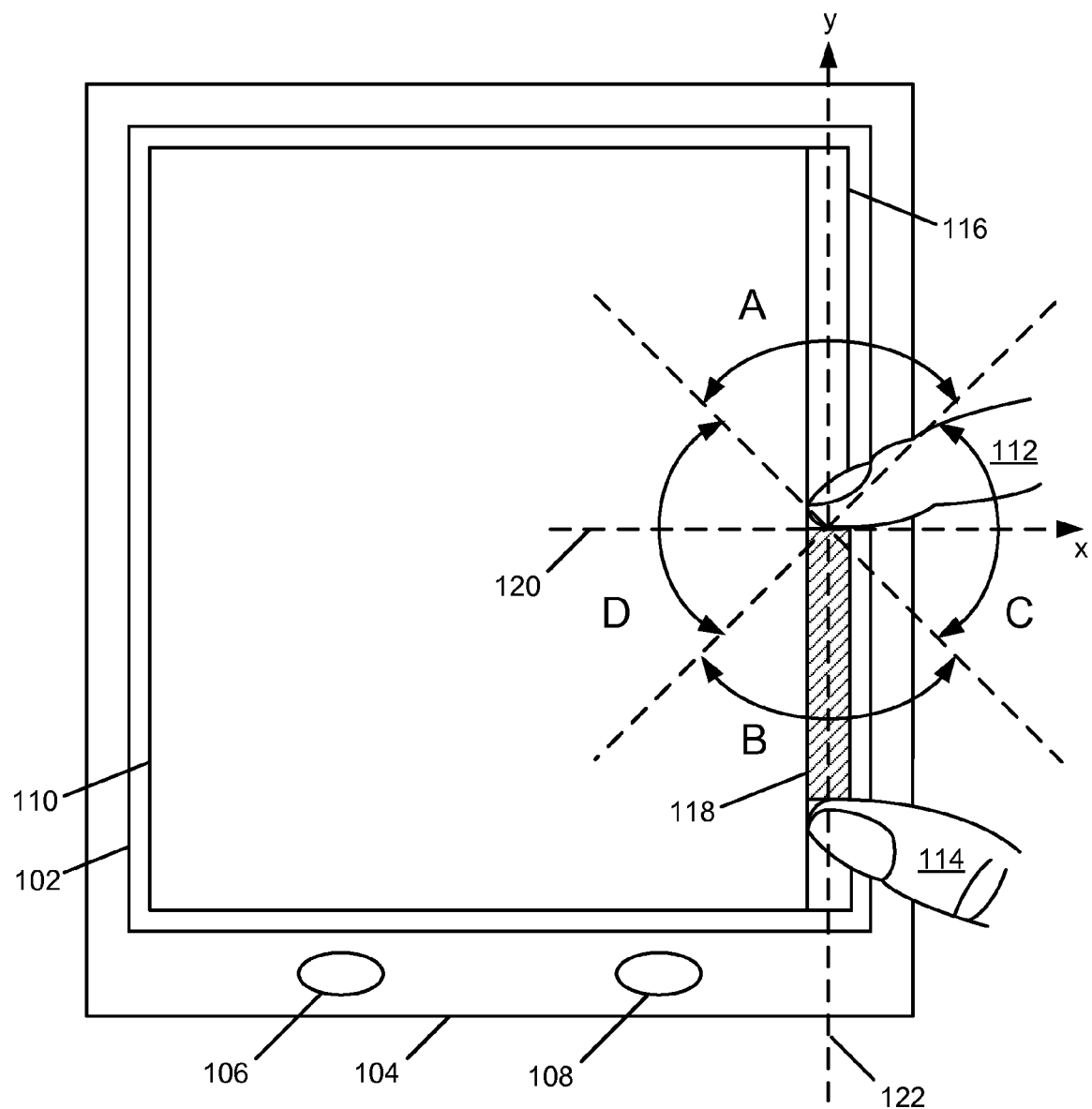
FIG. 1 is an example of an implementation of a consumer electronics device and illustrates an example coordinate system according to an embodiment of the present subject matter.

FIG. 1 is an example of an implementation of a consumer electronics device 100 and illustrates an example coordinate system used to describe the present subject matter. The consumer electronics device 100 includes a multitouch input display device 102 mounted within an enclosure 104. A microphone 106 and a speaker 108 provide additional input and output capabilities, respectively, for the consumer electronics device 100.

As will be described in more detail below, the multitouch input display device 102 allows a user of the consumer electronics device 100 to manipulate content displayed within a graphical user interface (GUI) 110 by sliding the user's index finger 112 and thumb 114 across a display surface of the multitouch input display device 102. It should be noted that while the present examples illustrate use of the user's index finger 112 and thumb 114 for interacting with the multitouch input display device 102, this should not be considered limiting. For example, the user may use an index finger from each hand, two stylus pens, or any other contact mechanisms without departure from the scope of present subject matter.

Within the GUI 110, a scrollbar 116 is illustrated. Within the scrollbar 116 a scroll element 118 is depicted. As described above and in more detail below, the user interacts with the GUI 110 by sliding the index finger 112 and the thumb 114 in various directions relative to one another across the surface of the multitouch input display device 102. For purposes of the present subject matter, an x-axis 120 and a y-axis 122 are illustrated, with the y-axis 122 axially-oriented relative to a length of the scrollbar 116. The x-axis 120 is illustrated perpendicular to y-axis 122. Movements of the user's index finger 112 and thumb 114 are defined herein to be axially-oriented if they move in a generally axial direction relative to the y-axis 122. Likewise, movements of the user's index finger 112 and thumb 114 will be considered laterally-oriented if they move in a generally axial direction relative to the x-axis 120.

Using the index finger 112 as an example, a region defined by the arced arrow A and the arced arrow B illustrate regions relative to the y-axis 122 that are considered to be axial regions for movement of the index finger 112. As such, if the user moves the index finger 112 vertically upward relative to the illustration within FIG. 1 within the region defined by the arced arrow A or downward within the region defined by the arced arrow B, these movements may be detected by the consumer electronics device 100 to be axially-oriented movements of the user's index finger 112. Similarly, lateral movements of the user's index finger 112 within the regions defined by the arced arrow C or the arced arrow D will be considered laterally-oriented movements of the user's index finger 112.

A similar coordinate system is oriented relative to the user's thumb 114. However, for ease of illustration purposes, the coordinate system associated with the thumb 114 is not illustrated within FIG. 1. It is understood that this similar coordinate system may be readily associated with movements of the user's thumb 114 based upon the description above for the user's index finger 112.

As will be described in more detail below, when a user contacts the display surface of the multitouch input display device 102, the consumer electronics device 100 detects this contact. If the contact is in a location approximating an axial end of the scroll element 118, the consumer electronics device 100 detects this contact location and orients a coordinate system as described above at the location of the contact on the display surface. When a second contact is detected that is in a location approximating a display location for an opposite axial end of the scroll element 118, the consumer electronics device 100 detects this contact and orients a coordinate system as described above at the second contact location.

As the user slides the index finger 112 in any direction from the initial contact location of the index finger 112, as defined by the arced arrows A through D, the consumer electronics device 100 detects this movement and performs an action upon content displayed within the GUI 110 based upon this detected movement. Likewise, as the user slides the thumb 114 in any direction from the initial contact location for the thumb 114, as defined by the arced arrows A through D, the consumer electronics device 100 detects this movement and performs an action upon content displayed within the GUI 110 based upon this detected movement.

Furthermore, the user controls manipulation of content displayed within the GUI 110 by sliding the index finger 112 and the thumb 114 across the display surface of the multitouch input display device 102 relative to current display locations of the axial ends of the scroll element 118. For example, by performing a pinching action across the display surface such that the index finger 112 is slid downward (e.g., into the region defined by the arced arrow B) and the thumb 114 is slid upward (e.g., into the region defined by its relative arced arrow A) within their respective coordinate systems, the user indicates a desire to zoom in on the content displayed within the GUI 110 to show less of the content at a higher resolution. Similarly, by performing a stretching operation on the scroll element 118 by sliding the index finger 112 upward (e.g., into the region defined by the arced arrow A) and the thumb 114 downward (e.g., into the region defined by its relative arced arrow B) within their respective coordinate systems, the user indicates a desire to zoom the content displayed within the GUI 110 outward to show more of the available content for display at a lower resolution. For purposes of the present description, the above-described pinching and stretching motions are recognized to be axially-oriented motions in opposite directions.

As another example, if a user wishes to mark a row or item of content displayed within the GUI 110, the user may perform a lateral sliding motion with either the index finger 112 or the thumb 114 as defined by the regions referenced by the arced arrow C and the arced arrow D to cause the consumer electronics device 100 to mark a portion of the content. After making an initial mark associated with the content displayed within the GUI 110, the user may again initiate movements that cause the consumer electronics device 100 to zoom the content as described above or may initiate movements that cause the consumer electronics device 100 to scroll the content by sliding the index finger 112 and the thumb 114 in similar axial directions as defined by the regions illustrated with the arced arrow A and the arced arrow B. The user may then perform another lateral sliding motion with either the index finger 112 or the thumb 114 to cause the consumer electronics device 100 to mark a second location within the content displayed within the GUI 110.

Additionally, a region of the content displayed within the GUI 110 may be marked and defined by a region of the content between the first and second marking operations. The user may also initiate movements that cause the consumer electronics device 100 to perform a zoom operation as described above prior to or coincident with the second marking operation. As such, the user is provided with a fluid way to manipulate content displayed within the GUI 110 and an intuitive user interface mechanism. It should be noted that as the user performs the pinching and stretching movements described above, the consumer electronics device 100 detects these movements and adjusts a displayed length of the scroll element 118 within the scrollbar 116 based upon relative distances of the sliding movements of the index finger 112 and the thumb 114 and the available content for display. Accordingly, in addition to zooming the content displayed within the GUI 110, the consumer electronics device 100 adjusts the length of the scroll element 118 to provide the user with feedback representing the proportion of the content that is available for display relative to that which is presently displayed within the GUI 110.

As will be described in more detail below in association with FIG. 2 through FIG. 11, the consumer electronics device 100 allows a user to manipulate and mark content by performing coincident sliding actions on a display surface that resemble physical manipulations (e.g., pinching, stretching, twisting, etc.) of a multicontact element, such as a scrollbar element. It should be noted that the consumer electronics device 100 may be a portable computing device. It should also be noted that the consumer electronics device 100 may be any computing device capable of processing information as described above and in more detail below. For example, the consumer electronics device 100 may include devices such as a personal computer (e.g., desktop, laptop, palm, etc.) or a handheld device (e.g., cellular telephone, personal digital assistant (PDA), email device, music recording or playback device, etc.), or any other device capable of processing information as described in more detail below.

Figure 2:
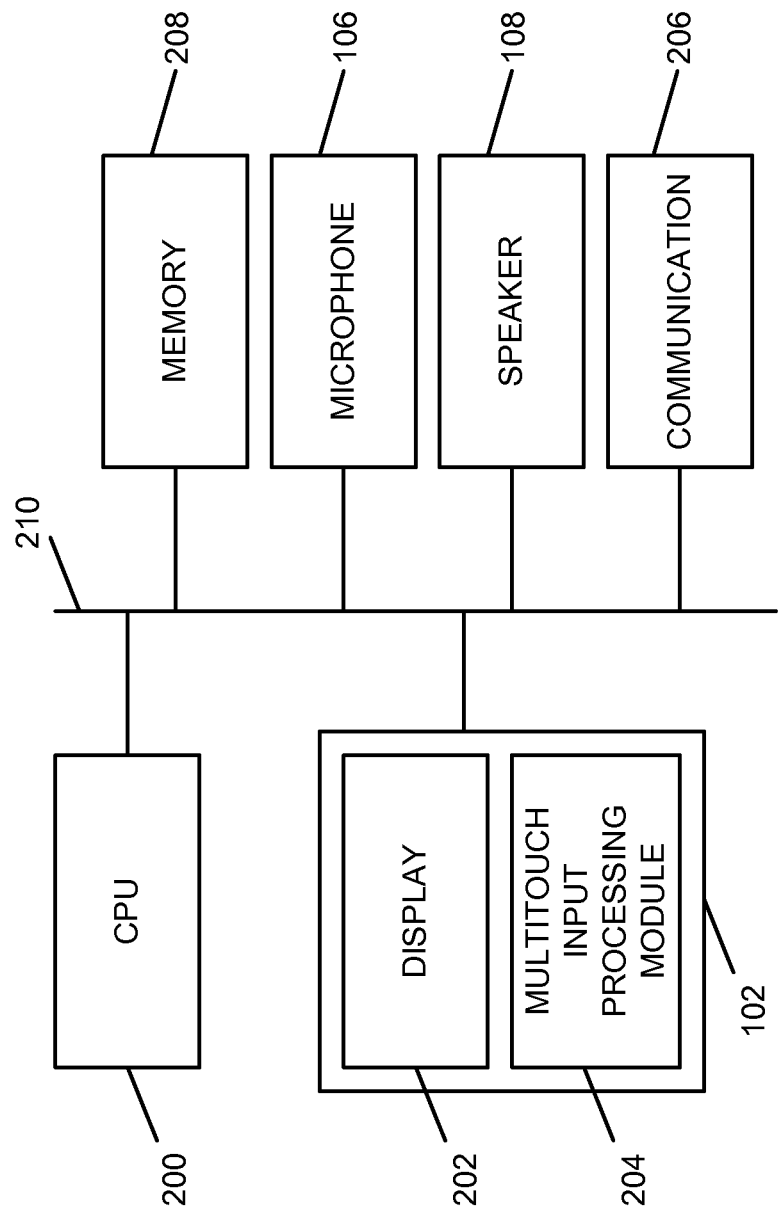
FIG. 2 is a block diagram of an example of an implementation of a consumer electronics device for automated content manipulation within a multitouch input display device based upon sliding user contact actions across a display surface of the multitouch input display device according to an embodiment of the present subject matter.

FIG. 2 is a block diagram of an example of an implementation of the consumer electronics device 100 for automated content manipulation within a multitouch input display device 102 based upon sliding user contact actions across a display surface of the multitouch input display device 102. A central processing unit (CPU) 200 provides computer instruction execution, computation, and other capabilities within the consumer electronics device 100. The multitouch input display device 102 is shown to include a display 202 that provides visual information to a user of the consumer electronics device 100 and a multitouch input processing module 204 that detects user interactions with the display 202 and provides input capabilities for the user of the consumer electronics device 100.

The display 202 may include any display device, such as a cathode ray tube (CRT), liquid crystal display (LCD), light emitting diode (LED), projection, touchscreen, or other display element or panel. The multitouch input processing module 204 may include any form of multitouch input processing module capable of sensing user contacts and interactions with a surface of the display 202, such as by capacitive sensing or other suitable technology, by which the user may interact with and respond to information on the display 202.

A communication module 206 provides interconnection capabilities that allow the consumer electronics device 100 to communicate with other modules (not shown). For example, the consumer electronics device 100 may communicate with content servers (e.g., web servers) and communication networks (e.g., wireless and wired networks). The communication module 206 may include any electrical, protocol, and protocol conversion capabilities useable to provide the interconnection capabilities. Though the communication module 206 is illustrated as a component-level module for ease of illustration and description purposes, it should be noted that the communication module 206 includes any hardware, programmed processor(s), and memory used to carry out the functions of the communication module 206 as described above and in more detail below. For example, the communication module 206 may include additional controller circuitry in the form of application specific integrated circuits (ASICs), processors, antennas, and/or discrete integrated circuits and components for performing communication and electrical control activities associated with the communication module 206. Additionally, the communication module 206 also includes interrupt-level, stack-level, and application-level modules as appropriate. Furthermore, the communication module 206 includes any memory components used for storage, execution, and data processing for performing processing activities associated with the communication module 206. The communication module 206 may also form a portion of other circuitry described without departure from the scope of the present subject matter.

A memory 208 provides storage capabilities for the consumer electronics device 100. It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

The microphone 106 and the speaker 108 are also depicted to illustrate additional input and output interconnections for the consumer electronics device 100, respectively. The CPU 200, the display 202 and the multitouch input processing module 204 of the multitouch input display device 102, the communication module 206, the memory 208, the microphone 106, and the speaker 108 are interconnected via an interconnection 210. The interconnection 210 may include a system bus, a network, or any other interconnection capable of providing the respective components with suitable interconnection for the respective purpose.

While the consumer electronics device 100 is illustrated with and has certain components described, other modules and components may be associated with the consumer electronics device 100 without departure from the scope of the present subject matter. Additionally, it should be noted that, while the consumer electronics device 100 is described as a single device for ease of illustration purposes, the components within the consumer electronics device 100 may be co-located or distributed and interconnected via a network without departure from the scope of the present subject matter. For a distributed arrangement, the display 202 and the multitouch input processing module 204 of the multitouch input display device 102 may be located at a point of sale device, kiosk, or other location, while the CPU 200 and memory 208 may be located at a local or remote server. Many other possible arrangements for components of the consumer electronics device 100 are possible and all are considered within the scope of the present subject matter. Accordingly, the consumer electronics device 100 may take many forms and may be associated with many platforms.

Figure 3:
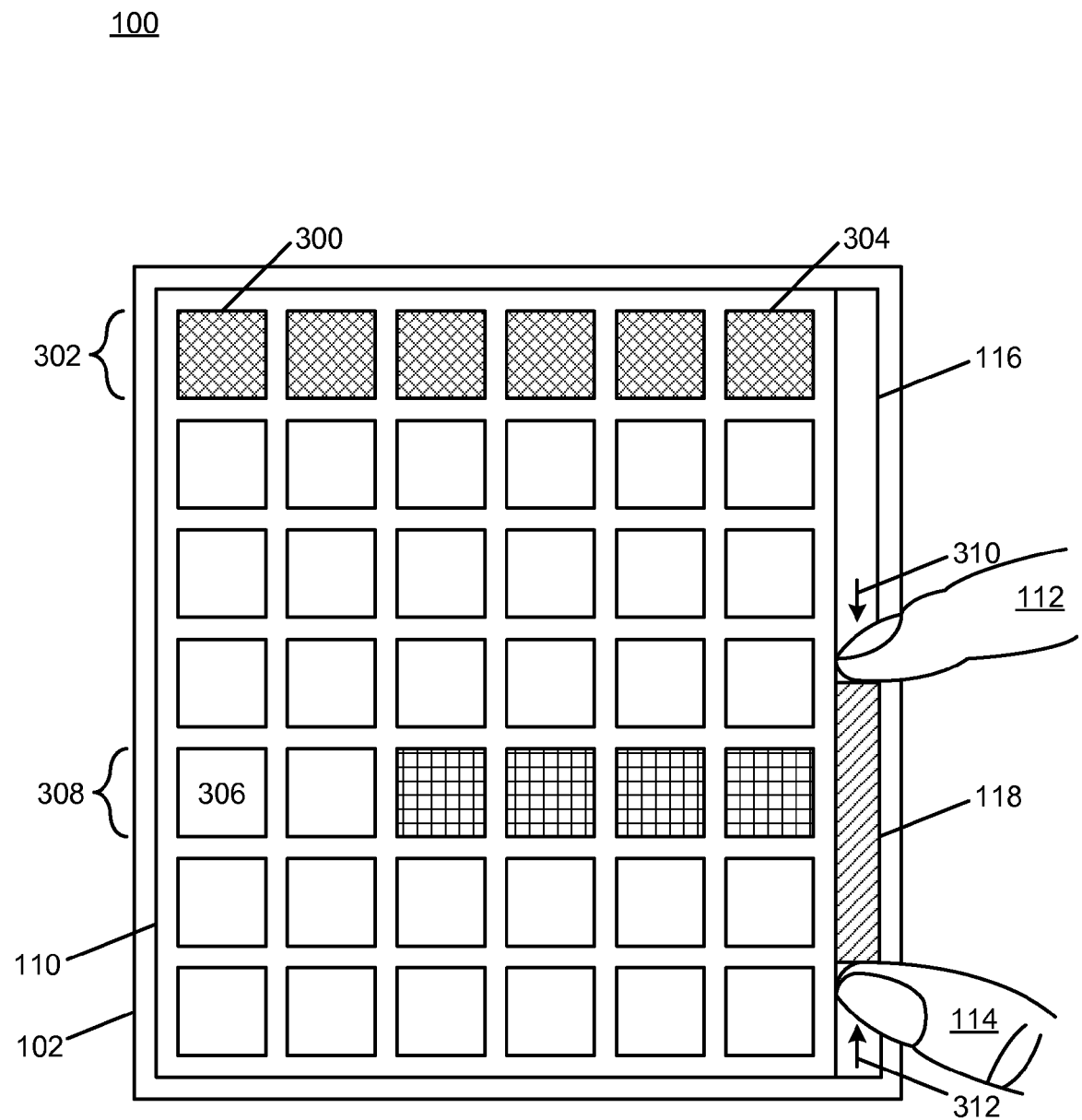
FIG. 3 is an example of an implementation of a consumer electronics device with content displayed within a graphical user interface (GUI) of a multitouch input display device according to an embodiment of the present subject matter.

FIG. 3 is an example of an implementation of the consumer electronics device 100 with content displayed within the GUI 110 of the multitouch input display device 102. For purposes of the present example, it is assumed that the content displayed within the GUI 110 represents photographic images, such as individual still photos or sequential frames of a video. However, any other type of content may be represented without departure from the scope of the present subject matter. It is additionally noted that the enclosure 104, the microphone 106, and the speaker 108 are not illustrated within FIG. 3 or the subsequent figures for ease of illustration purposes.

As can be seen from FIG. 3, an element 300 represents a first element (e.g., image) within a row 302 that includes 6 cross-hatched images, with the row 302 ending with a last element 304. Additionally, an element 306 represents a first element within a row 308 that includes 4 differently cross-hatched images. For purposes of the example, it is assumed that the six cross-hatched images in the row 302 and the four differently cross-hatched images in the row 308 are images that are clusters of content that the user may be interested in finding within the content displayed within the GUI 110. For example, the images in the row 302 may be still images or video sequence from a graduation ceremony. Likewise, the images within the row 308 may be still images or a sequence of video images associated with a sporting event. While not depicted within FIG. 3, it is also understood that additional content may be available for display beyond that depicted within FIG. 3.

FIG. 4 through FIG. 10 below illustrate example operations that the user may perform using the consumer electronics device 100. As will be described in more detail below, the user may perform various interactions and the consumer electronics device 100 may detect these various interactions and process content for display in response to such detections. For example, the consumer electronics device 100 may detect pinching movements, stretching movements, and lateral movements with the index finger 112 and the thumb 114 across the display surface of the multitouch input display device 102. Movements such as pinching and stretching movements may be detected and content may be automatically zoomed in or out, respectively, by the consumer electronics device 100 within the GUI 110 to form an intuitive user interface experience for the user. Additionally, lateral movements may be detected and used to identify and mark a portion of content, such as the sequence of graduation images depicted within the row 302 of FIG. 3, for further processing. The further processing may include copying, editing, deleting, moving, or other content related operations without departure from the scope of the present subject matter.

Returning to the description of FIG. 3, the scroll element 118 is illustrated oriented in a general location of the row 308 within the GUI 110. For purposes of the present example, it is assumed that the user wishes to cause the consumer electronics device 100 to zoom in on the sequence of images in the row 308 to determine whether these images are associated with the graduation ceremony. Accordingly, an arrow 310 and an arrow 312 within FIG. 3 represent that the user performs a sliding pinching motion across the display surface of the multitouch input display device 102 by moving the index finger 112 in the direction of the arrow 310 (e.g., down within the illustration of FIG. 3) and the thumb 114 in the direction of the arrow 312 (e.g., up within the illustration of FIG. 3). It can also be seen that the sliding pinching motion is approximately axial relative to a length of the scrollbar 116. As described above and in more detail below, these sliding movements are detected by the consumer electronics device 100 and the content displayed within the GUI 110 is processed in response to detecting these sliding movements.

Figure 4:
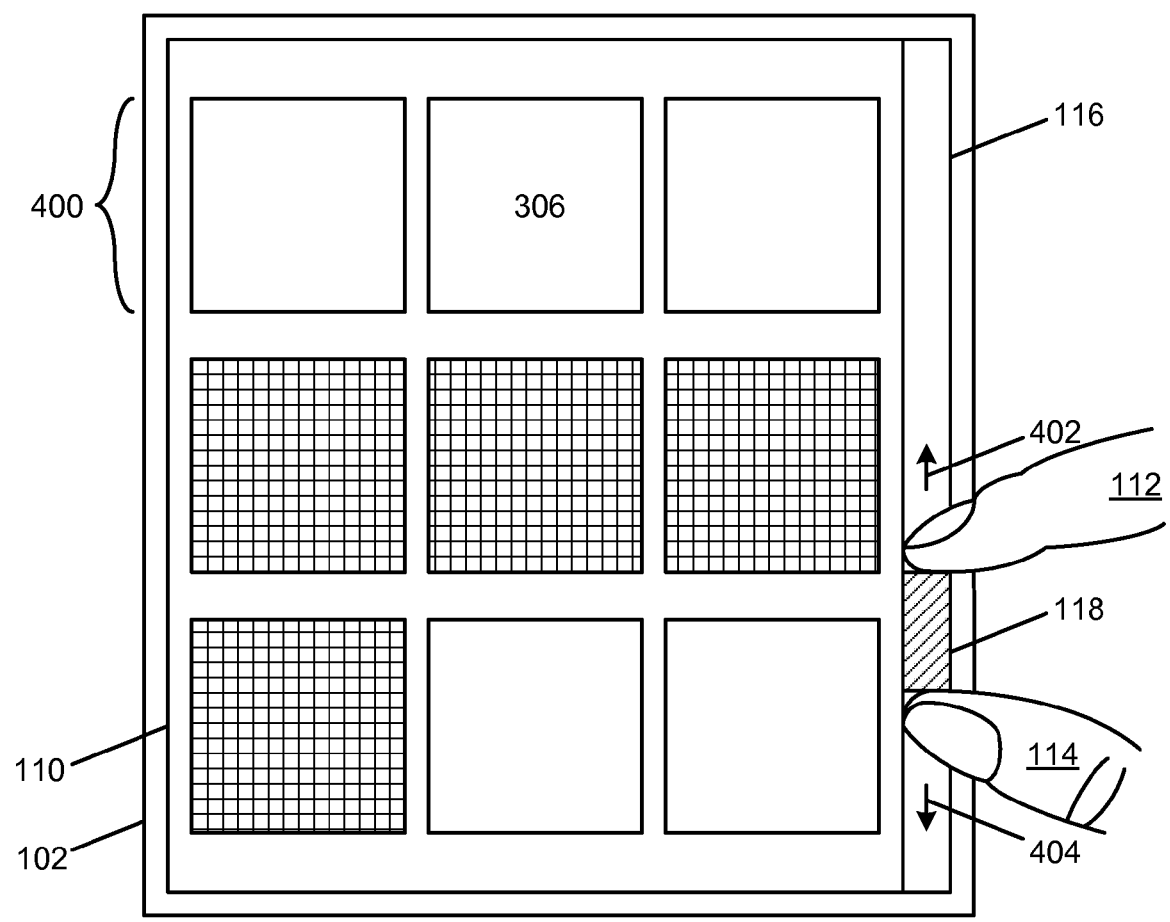
FIG. 4 is an example of an implementation of a GUI of a consumer electronics device after the user has performed the pinching motion described above in association with FIG. 3 and the content displayed within the GUI has been zoomed in response to the pinching action according to an embodiment of the present subject matter.

FIG. 4 is an example of an implementation of the GUI 110 of the consumer electronics device 100 after the user has performed the pinching motion described above in association with FIG. 3 and the content displayed within the GUI 110 has been zoomed in response to the pinching action. As can be seen from FIG. 4, the image elements within the row 308 are enlarged and reorganized based upon an available viewable area within the GUI 110. As such, the element 306 that was previously located as the first element within the row 308 is now positioned in a center position of a top row 400 and the remaining elements of the row 308, including the 4 crosshatched elements, are arranged within the GUI 110 so that the user may determine whether these images represent images of the graduation ceremony.

For purposes of the present example, as described above, the sequence of images within the row 308 that are crosshatched are not the graduation images. Accordingly, it assumed that the user performs a stretching operation with the index finger 112 and the thumb 114 as represented by the arrows 402 and 404, respectively, and that these sliding movements in approximately opposite directions are detected by the consumer electronics device 100 and the content displayed within the GUI 110 is processed in response to detecting these sliding movements. Additionally, though not depicted within FIG. 4 for ease of illustration purposes, it is also assumed that the user further causes the consumer electronics device 100 to scroll upward by performing sliding actions in similar directions and generally upward as defined within FIG. 1 in the region depicted by the arced arrow A with each of the index finger 112 and the thumb 114 after or concurrent to performing this stretching movement and that the consumer electronics device 100 zooms the content out to allow the user to view more of the available content within the GUI 110.

Figure 5:
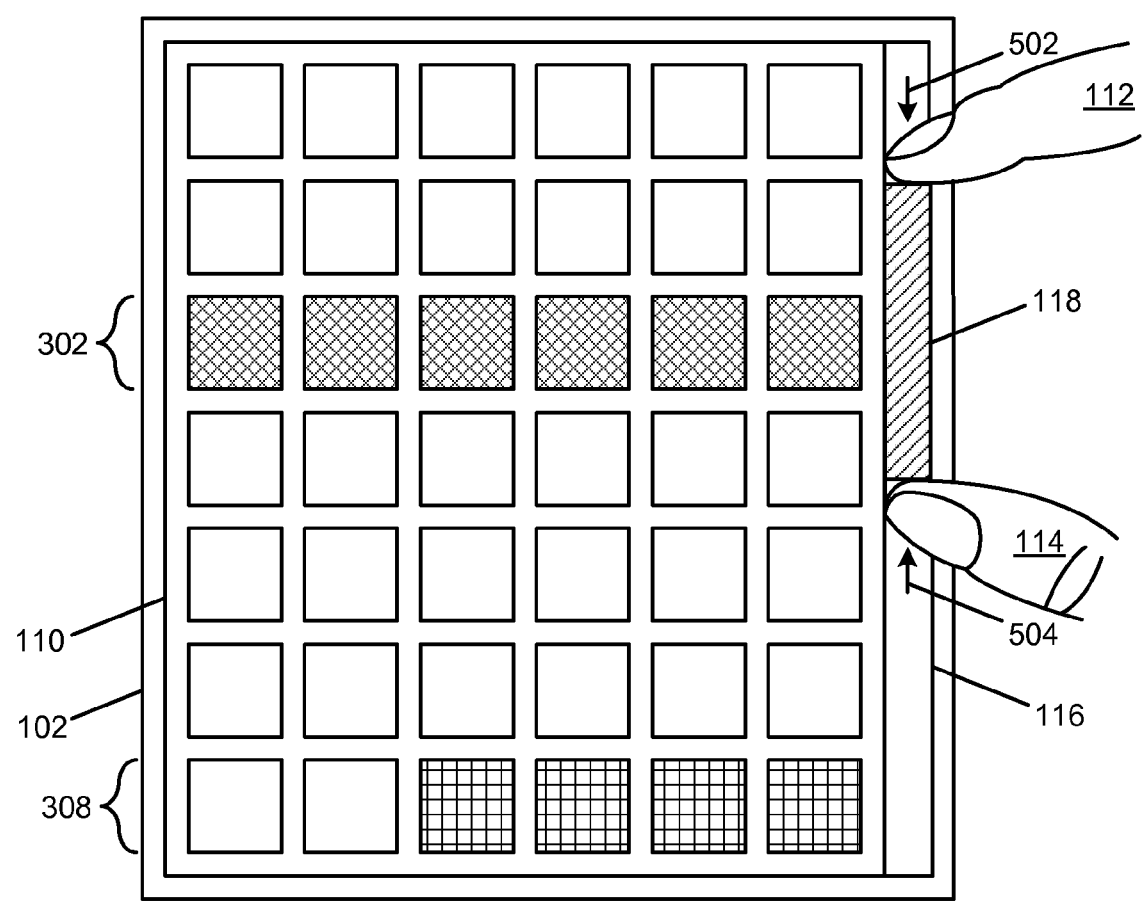
FIG. 5 is an example of an implementation of a GUI of a consumer electronics device after the user has initiated movements that cause the consumer electronics device 100 to zoom out and scroll up as described above in association with FIG. 4 according to an embodiment of the present subject matter.

FIG. 5 is an example of an implementation of the GUI 110 of the consumer electronics device 100 after the user has initiated movements that cause the consumer electronics device 100 to zoom out and scroll up as described above in association with FIG. 4. As can be seen in FIG. 5, the scroll element 118 has been lengthened to represent a proportional amount of content that is presently displayed within the GUI 110 and has been moved up within the scrollbar 116 based upon detection of the user's sliding movements (e.g., both in approximately opposite directions and in approximately similar directions vertically) to position the scroll element 118 in general proximity to the row 302. For purposes of the present example, it is assumed that the user wishes to causes the consumer electronics device 100 to zoom in on the row 302 and performs a pinching operation with the index finger 112 and the thumb 114 as represented by the arrows 502 and 504, respectively. As can be seen from FIG. 5, the arrows 502 and 504 represents sliding movements of the index finger 112 and the thumb 114 in approximately opposite directions. It can also be seen that the sliding pinching motion is approximately axial relative to a length of the scrollbar 116.

Figure 6:
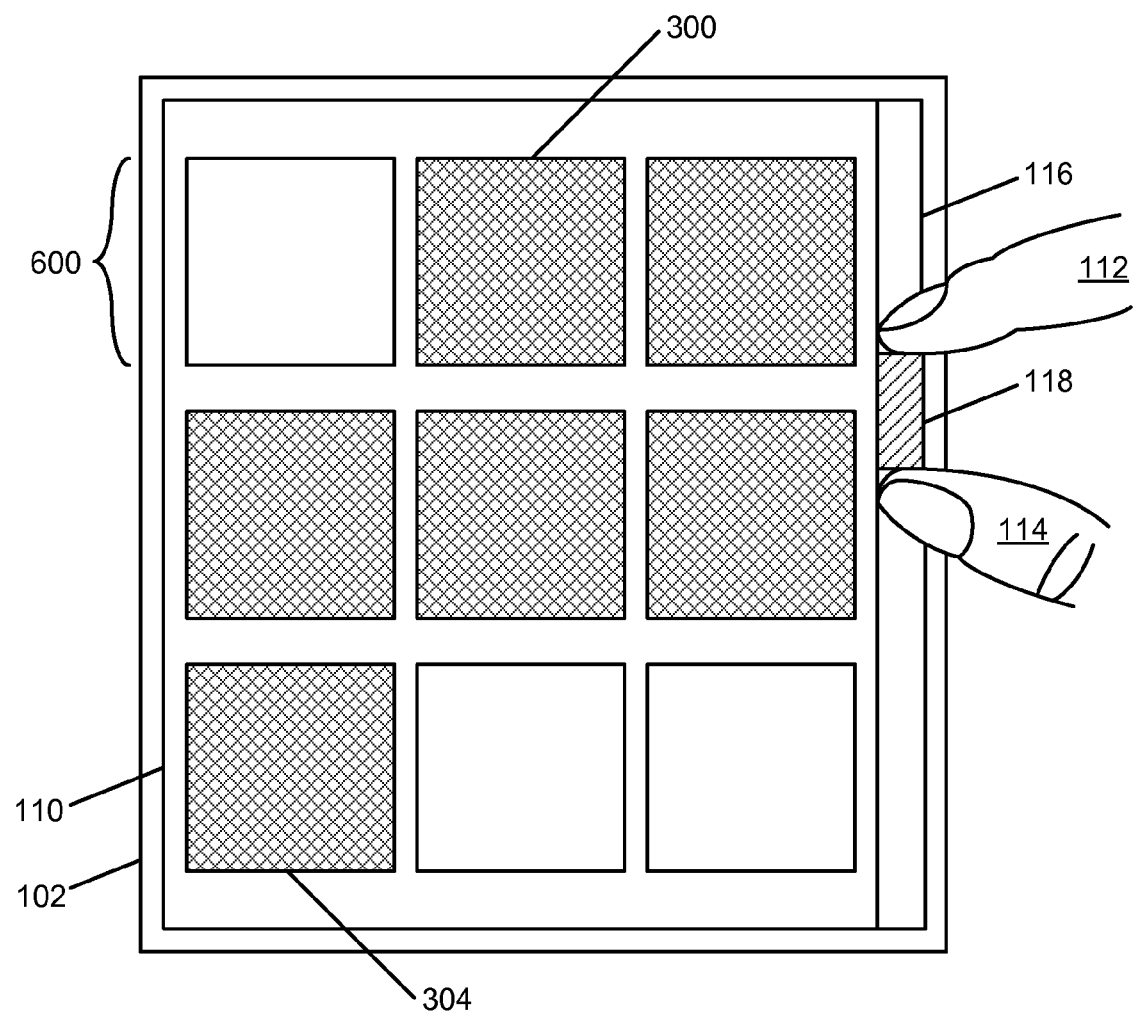
FIG. 6 is an example of an implementation of a GUI of a consumer electronics device after the user has performed the pinching operation across the display surface of a multitouch input display device as described above in association with FIG. 5 according to an embodiment of the present subject matter.

FIG. 6 is an example of an implementation of the GUI 110 of the consumer electronics device 100 after the user has performed the pinching operation across the display surface of the multitouch input display device 102 as described above in association with FIG. 5. As can be seen from FIG. 6, the scroll element 118 has been automatically adjusted in size in response to detection of the user's sliding movements to provide the user with feedback with respect to the amount of content presently displayed within the GUI 110 and in proportion to an available amount of content for display. As can also be seen, the image elements within the row 302 are enlarged and reorganized based upon an available viewable area within the GUI 110. As such, the element 300 that was previously a first element within the row 302 is now positioned within a center position of a row 600 and the remaining elements of the row 302, including the last element 304, are arranged within the GUI 110 so that the user may determine whether this sequence of images represent images from the graduation ceremony. For purposes of the present example, it is again assumed that the elements within the row 302 beginning with the element 300 are of the graduation ceremony and that the user has identified the sequence of images of interest.

Figure 7:
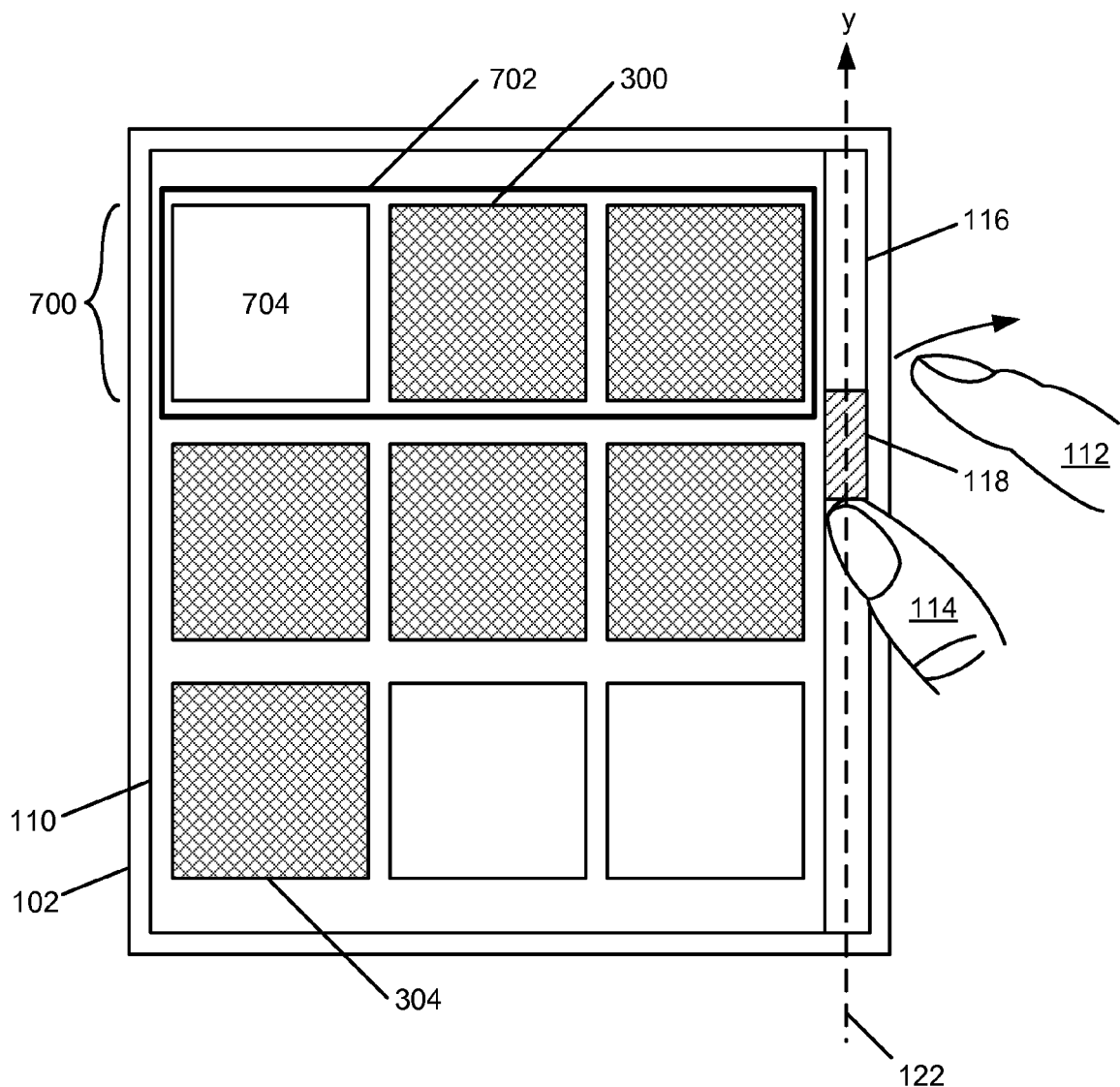
FIG. 7 is an example of an implementation of a GUI of a consumer electronics device after the user has made a lateral movement across the display surface of a multitouch input display device to indicate a desire to mark a current location within the content displayed within the GUI according to an embodiment of the present subject matter.

FIG. 7 is an example of an implementation of the GUI 110 of the consumer electronics device 100 after the user has made a lateral movement across the display surface of the multitouch input display device 102 to indicate a desire to mark a current location within the content displayed within the GUI 110. As described above in association with FIG. 1, and as can be seen within FIG. 7, the user has slid the index finger 112 in a right laterally-oriented direction relative to the y-axis 122 and within the region defined by the arced arrow C shown in FIG. 1. The consumer electronics device 100 detects this lateral movement within the region defined by the arced arrow C and marks the present location within the content displayed within the GUI 110. It should be noted that a left laterally-oriented movement relative to the y-axis 122 may also be used for detecting a user's desire to mark content without departure from the scope of the present subject matter.

For purposes of the present example, it is assumed that the current location at which the content is marked within the GUI 110 is the first row 700 illustrated within FIG. 7. Accordingly, in response to detecting the lateral movement of the index finger 112 across the surface of the multitouch input display device 102, the consumer electronics device 100 marks the first row of content represented by the row 700 within the present example. It should, however, be understood that there are many possible ways of identifying a current location for marking purposes. For example, a user my finely adjust one of the index finger 112 and the thumb 114 axially relative to the y-axis 122 and this movement may be detected and result in a movement of a focus location within the GUI 110 from item to item. Many other possibilities exist for marking content and all are considered within the scope of the present subject matter. As can also be seen from FIG. 7, the entire row 700 has been marked with an outline 702 to provide the user with feedback that the marking operation was successful and that the outline 702 includes the first image 300 of the row 302 from FIG. 3 that is of interest. It should also be noted that for purposes of the present example, it is acceptable that an additional element 704 is included within the row 700 encompassed by the outline 702. To mark the end of the sequence of images of the graduation ceremony, the user may scroll down within the present example because the user will be able to determine from the displayed content that the last graduation ceremony image is viewable at the current zoomed resolution.

Figure 8:
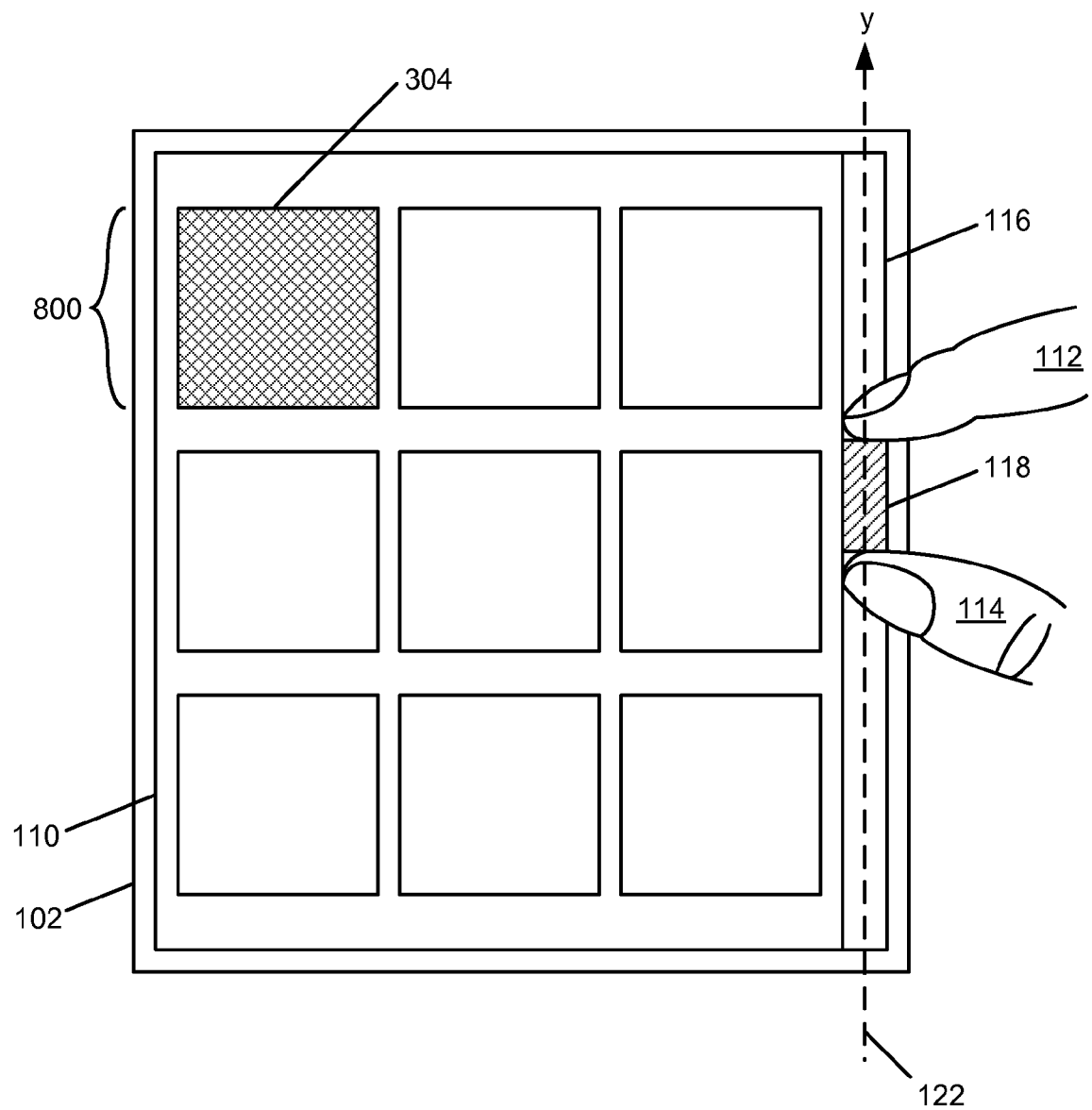
FIG. 8 is an example of an implementation of a GUI of a consumer electronics device after the user has placed an index finger back on a display surface of a multitouch input display device in a location that approximates an axial end of a scroll element from which the previous lateral movement described in association with FIG. 7 originated according to an embodiment of the present subject matter.

FIG. 8 is an example of an implementation of the GUI 110 of the consumer electronics device 100 after the user has placed the index finger 112 back on the display surface of the multitouch input display device 102 in a location that approximates the axial end of the scroll element 118 from which the previous lateral movement described in association with FIG. 7 originated. It can also been seen from FIG. 8 that the user has scrolled the content displayed within the GUI 110 downward such that the top row 800 displays the last element 304 associated with the graduation ceremony from the row 302 of FIG. 3. As described above, the user initiated the scrolling action by performing a sliding movement with the index finger 112 and the thumb 114 axially relative to the y-axis 122 and downward within the representation of FIG. 8 to position the last element 304 of the row 302 within the row 800.

Figure 9:
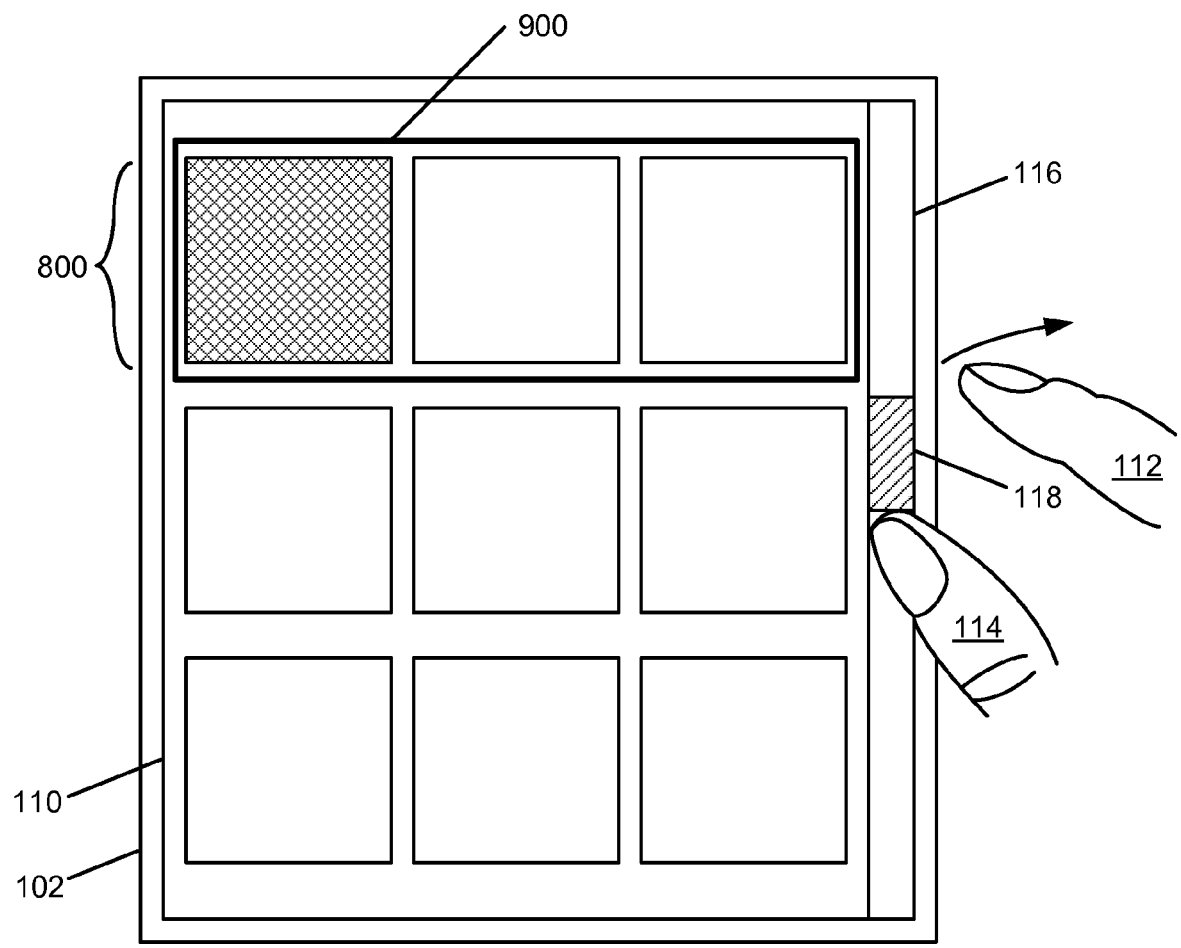
FIG. 9 is an example of an implementation of a GUI of a consumer electronics device after the user has performed a second lateral movement as described above in association with FIG. 7 to mark an additional row to indicate that the additional row includes a last video image of interest in a series according to an embodiment of the present subject matter.

FIG. 9 is an example of an implementation of the GUI 110 of the consumer electronics device 100 after the user has performed a second lateral movement as described above in association with FIG. 7 to mark the additional row 800 to indicate that the additional row 800 includes the last video image of interest in the series. As can also be seen from FIG. 9, the entire row 800 has been marked with an outline 900 to provide the user with feedback that the marking operation was successful.

Figure 10:
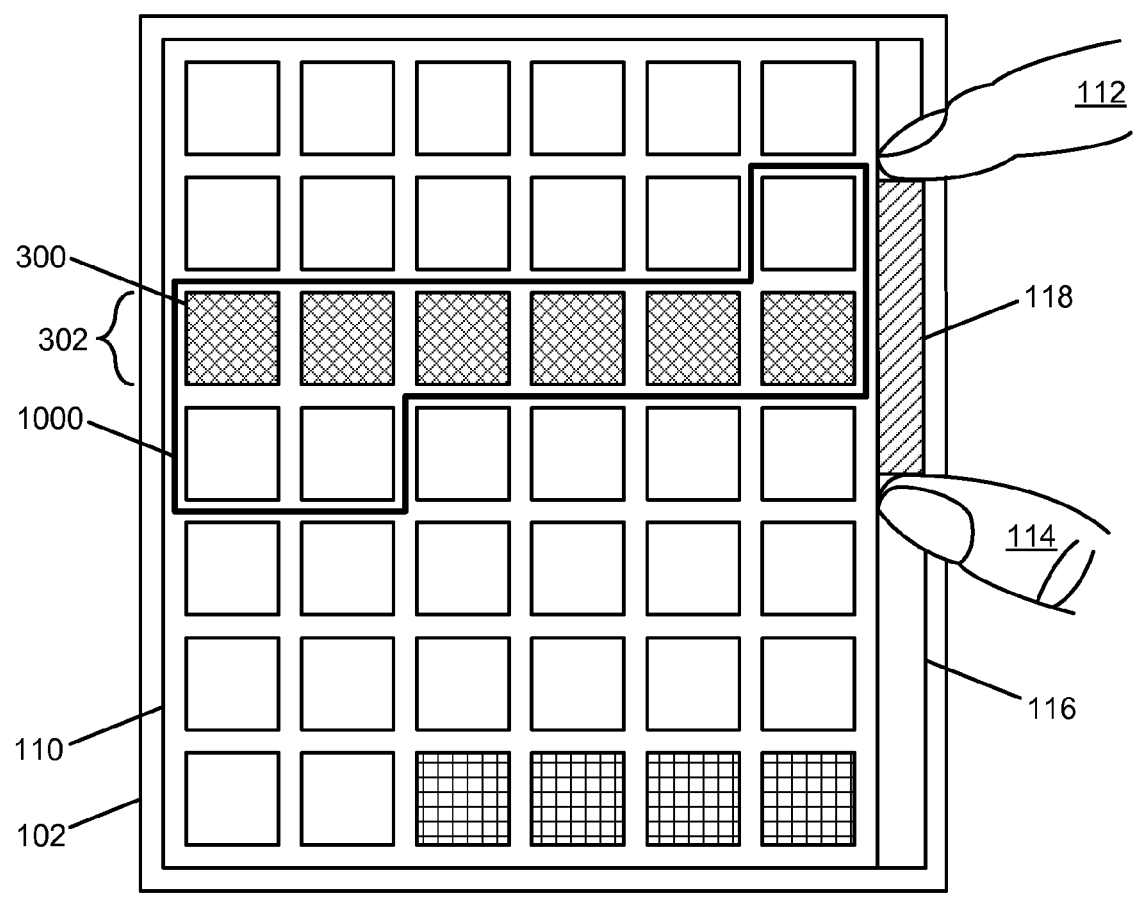
FIG. 10 is an example of an implementation of a GUI of a consumer electronics device after the user has initiated movements that cause the consumer electronics device to zoom out after marking a last image in a sequence of graduation images according to an embodiment of the present subject matter.

FIG. 10 is an example of an implementation of the GUI 110 of the consumer electronics device 100 after the user has initiated movements that cause the consumer electronics device 100 to zoom out after marking the last image in the sequence of graduation images. As can been seen from FIG. 10, all of the images represented within the content displayed within the GUI 110 between the first mark represented by the outline 702 of FIG. 7 and the last marking represented by the outline 900 of FIG. 9 are highlighted with an outline 1000. It can also be seen that the scroll element 118 within the scrollbar 116 has been lengthened and positioned relative to the row 302 to illustrate that the user has performed the stretching operation and the scrolling operation as described above to cause the consumer electronics device 100 to zoom out and center the row 302 within the graphical representation of the scroll element 118. It is also understood that in response to the user performing the stretching and scrolling operations, the consumer electronics device 100 detected these movements and adjusted the displayed content and a displayed length of the scroll element 118 to provide the user with feedback that the sliding movements of the index finger 112 and the thumb 114 were detected and processed accordingly.

Accordingly, as described above in association with FIG. 3 through FIG. 10, example implementations of the consumer electronics device 100 detect sliding user movements across the display surface of the multitouch input display device 102 associated with display locations for graphical user interface elements. The detected user movements resemble pinching, stretching, and lateral movements across the display surface from the user's perspective. In response to detecting these sliding movements, the consumer electronics device 100 adjusted a quantity of content displayed within the GUI 110 by zooming the content and adjusted a length of the scroll element 118 to provide the user with feedback. Additionally, the consumer electronics device 100 provided a marking within the content in response to lateral movements across the display surface to highlight marked locations and content.

Figure 11:
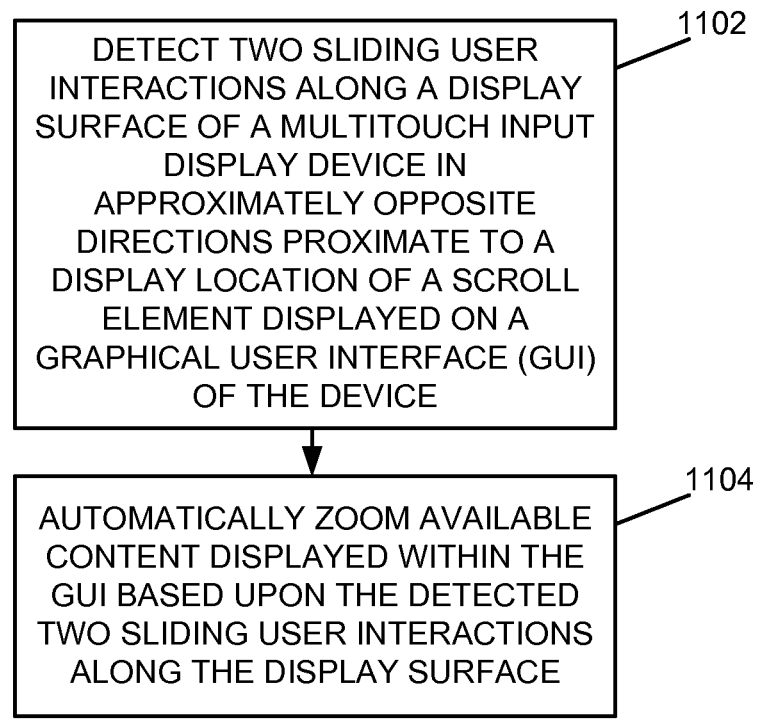
FIG. 11 is a flow chart of an example of an implementation of a process for performing automated zooming of content displayed within a GUI in response to detecting two sliding user interactions along a display surface of a multitouch input display device in opposite directions according to an embodiment of the present subject matter.
Figure 12:
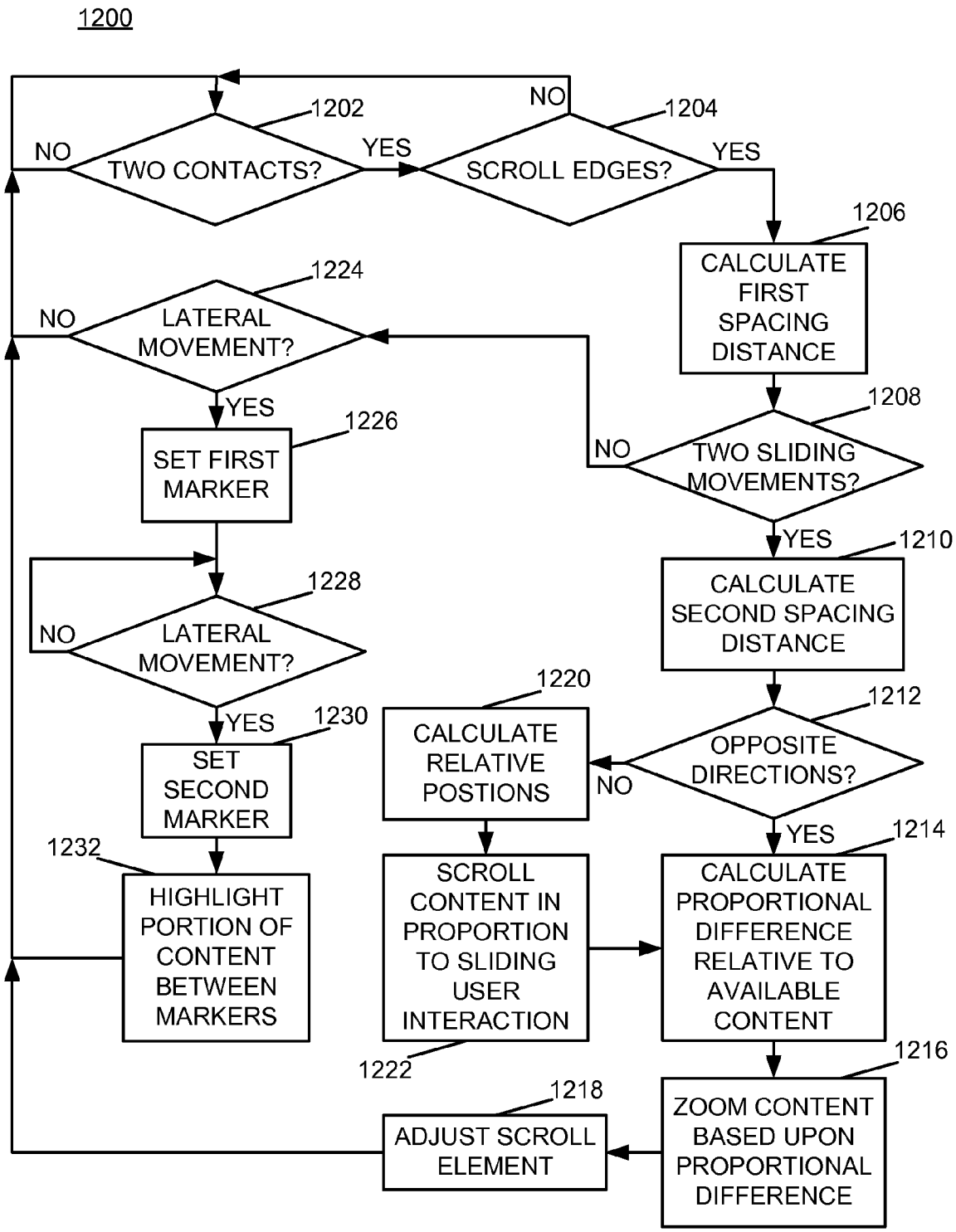
FIG. 12 is a flow chart of an example of an implementation of a process for performing automated zooming, scrolling, and marking of content displayed within a GUI in response to detecting sliding movements along a display surface of a multitouch input display device in one of opposite directions, similar directions, and lateral directions, respectively, according to an embodiment of the present subject matter.

FIG. 11 and FIG. 12 below describe example processes that may be executed by consumer electronics devices, such as the consumer electronics device 100, to perform the automated zooming and scrolling associated with the present subject matter. Many other variations on the example processes are possible and all are considered within the scope of the present subject matter. The example processes may be performed by modules, such as the multitouch input processing module 204 and/or executed by the CPU 200, associated with consumer electronics devices. It should be noted that timeout procedures and other error control procedures are not illustrated within the example processes described below for ease of illustration purposes. However, it is understood that all such procedures are considered to be within the scope of the present subject matter.

FIG. 11 is a flow chart of an example of an implementation of a process 1100 for performing automated zooming of content displayed within the GUI 110 in response to detecting two sliding user interactions along a display surface of the multitouch input display device 102 in opposite directions. At block 1102, the process 1100 detects two sliding user interactions along a display surface of a multitouch input display device in approximately opposite directions proximate to a display location of a scroll element displayed on a graphical user interface (GUI) of the device. At block 1104, the process 1100 automatically zooms available content displayed within the GUI based upon the detected two sliding user interactions along the display surface.

FIG. 12 is a flow chart of an example of an implementation of a process 1200 for performing automated zooming, scrolling, and marking of content displayed within the GUI 110 in response to detecting sliding movements along a display surface of the multitouch input display device 102 in one of opposite directions, similar directions, and lateral directions, respectively. The process 1200 waits at decision point 1202 to detect two user contacts on a display surface of the multitouch input display device 102. When a determination is made that two user contacts have been detected, the process 1200 determines whether the two contact locations are proximate to edges of a display location of a scroll element displayed on a graphical user interface (GUI) of the multitouch input display device 102. For purposes of the present example, it should be understood that the edges approximate axial edges of a scroll element relative to a scrollbar, such as the scroll element 118 within the scrollbar 116 described above. However, it is also understood that any other type of scroll element is considered within the scope of the present subject matter where contact locations may be detected at edges of a display location for the respective scroll element.

When a determination is made at decision point 1204 that the two contact locations are not proximate to a display location of the scroll element 118 displayed on the GUI 110, the process 1200 returns to decision point 1202 to await detection of two subsequent user contact locations. When a determination is made that the two contact locations are proximate to a display location of the scroll element 118 displayed on the GUI 110, the process 1200 calculates a first spacing distance between the two detected contact locations at block 1206.

At decision point 1208, the process 1200 makes a determination as to whether two sliding movements (e.g., user interactions) have been detected along the display surface of the multitouch input display device 102. As discussed above, for purposes of the present example, timeout procedures and other error control procedures are not illustrated for ease of illustration purposes. As such, it is assumed that the process 1200 provides sufficient time at each stage of processing for the user to interact with the display surface of the multitouch input display device 102. Accordingly, when a determination is made at decision point 1208 that two sliding movements have been detected along the display surface of the multitouch input display device 102, the process 1200 detects resulting contact locations associated with each sliding movement and calculates a second spacing distance for each of the two resulting contact locations at block 1210.

At decision point 1212, the process 1200 makes a determination as to whether the two sliding movements were in opposite directions based upon the calculated second spacing distance relative to the first spacing distance.

When a determination is made that the two sliding movements were in opposite directions, the process 1200 calculates a proportional difference between the first spacing distance and the second spacing distance relative to a quantity of the available content at block 1214. At block 1216, the process 1200 automatically adjusts a displayed portion of the available content to zoom the content based upon the calculated proportional difference. For example, if the two resulting contact locations are closer together, the content may be adjusted to effect a zoom action inward to enlarge a portion of the content. In contrast, if the two resulting contact locations are farther apart, the content may be adjusted to effect a zoom action outward to display more content at a lesser resolution. At block 1218, the process 1200 automatically adjusts a size of the scroll element 118 in proportion to the automated zooming of the available content displayed within the GUI 110 and returns to decision point 1202 to await detection of two new user contacts on the display surface of the multitouch input display device 102.

Returning to the description of decision point 1210, when a determination is made that the two sliding movements were not in opposite directions (e.g., were in similar directions), the process 1200 calculates relative positions between the initial contact locations and the resulting contact locations at block 1220. At block 1222, the process 1200 scrolls content displayed within the GUI 110 in proportion to the sliding movements and the calculated relative positions. The process 1200 continues to block 1214 and continues processing as described above to determine whether a zoom operation is to be performed coincident with the scroll operation based upon proportional differences between the initial and resulting user contact locations.

Returning to the description of decision point 1208, when a determination is made that two sliding movements were not detected, a determination is made at decision point 1224 as to whether a single lateral movement was detected. As described above, a detected lateral movement may be used to mark content displayed within the GUI 110. When a determination is made that a lateral movement has not been detected, the process 1200 returns to decision point 1202 to continue processing as described above. When a determination is made that a lateral movement has been detected, the process 1200 sets a first marker within the available content at a first focus location associated with the available content displayed within the GUI 110 at block 1226. At decision point 1228, the process 1200 waits for a second lateral movement to be detected. When a second lateral movement is detected, the process 1200 sets a second marker within the available content at a second focus location associated with the available content displayed within the GUI 110 at block 1230. At block 1232, the process 1200 highlights a portion of the available content between the first marker and the second marker for display and returns to decision point 1202 to continue processing as described above.

Accordingly, the process 1200 provides automated zooming, scrolling, and marking of content displayed within the GUI 110 in response to detecting sliding movements along a display surface of the multitouch input display device 102 in one of opposite directions, similar directions, and lateral directions, respectively. The process may be modified to provide additional behavior associated with the described activities and additional processes may be derived from the process 1200 without departure from the scope of the present subject matter.

As described above in association with FIG. 1 through FIG. 12, the example systems and processes provide a scrollbar user interface for multitouch devices. Many other variations and additional activities associated with a multi-contact user interfaces for multitouch devices are possible and all are considered within the scope of the present subject matter.

Those skilled in the art will recognize, upon consideration of the above teachings, that certain of the above examples are based upon use of a programmed processor such as CPU 200. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable storage medium(s) may be utilized. The computer-usable or computer-readable storage medium may be, for example but not limited to, an electronic, magnetic, optical, electromagnetic, infrared, or semiconductor system, apparatus, device. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention has been described with reference to flowchart illustrations and/or block diagrams of methods, apparatus (systems) and computer program products according to example embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible example implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Those skilled in the art will recognize improvements and modifications to the preferred embodiments of the present invention. All such improvements and modifications are considered within the scope of the concepts disclosed herein and the claims that follow.

What is claimed is:

1. A computer-implemented method, comprising:
    detecting two simultaneous sliding user interactions along a display surface of a multitouch input display device axially directed relative to a length of a scrollbar and each proximate to a display location of one of first and second edges of a displayed scroll element of the scrollbar displayed on a graphical user interface (GUI) of the device;
    concurrently determining:
        whether the detected two simultaneous sliding user interactions result in a difference in relative spacing between initial user display contact locations and resulting user display contact locations; and
        whether the detected two simultaneous sliding user interactions also represent movement in similar axial directions axially relative to the length of the scrollbar;
    automatically zooming available content displayed within the GUI in proportion to any determined difference in the relative spacing between the initial user display contact locations and the resulting user display contact locations, where a detected pinching motion of the detected two simultaneous sliding user interactions closer together zooms in and enlarges a size of displayed portions of the available content and a detected stretching motion of the detected two simultaneous sliding user interactions further apart zooms out and reduces the size of the displayed portions of the available content; and
    concurrently scrolling the available content in proportion to any determined movement of a center of the scrollbar in the similar axial directions axially relative to the length of the scrollbar.

2. The computer-implemented method of claim 1, where detecting the two simultaneous sliding user interactions along the display surface of the multitouch input display device axially directed relative to the length of the scrollbar and each proximate to the display location of one of the first and second edges of the displayed scroll element of the scrollbar displayed on the GUI of the device comprises:
    detecting that a user has contacted the display surface of the multitouch input display device at first and second user contact locations that each approximate a display location for one of the first and second edges of the displayed scroll element of the scrollbar respectively; and detecting a first and second simultaneous sliding movement axially relative to the length of the scrollbar in approximately opposite directions, associated with the first and second user contact locations respectively, along the display surface to third and fourth user contact locations.

3. The computer-implemented method of claim 2, where automatically zooming the available content displayed within the GUI comprises:
calculating a first spacing distance between the first and second user contact locations;
calculating a second spacing distance between the third and fourth user contact locations;
calculating a proportional difference between the first spacing distance and the second spacing distance relative to a quantity of the available content; and
automatically adjusting a displayed portion of the available content based upon the calculated proportional difference.

4. The computer-implemented method of claim 1, further comprising automatically adjusting a size of the displayed scroll element in proportion to the automated zooming of the available content displayed within the GUI.

5. The computer-implemented method of claim 1, where detecting the two simultaneous sliding user interactions along the display surface of the multitouch input display device axially directed relative to the length of the scrollbar and each proximate to the display location of one of the first and second edges of the displayed scroll element of the scrollbar displayed on the GUI of the device comprises:
detecting two approximately axially-oriented simultaneous sliding user interactions along the display surface relative to an axis of movement of the displayed scroll element within the displayed scrollbar; and
automatically adjusting a size of the displayed scroll element axially within the displayed scrollbar in proportion to the automated zooming of the available content displayed within the GUI.

6. The computer-implemented method of claim 1, further comprising:
detecting a first lateral sliding user interaction along the display surface of the multitouch input display device approximately perpendicular to at least one of the two simultaneous sliding user interactions proximate to the display location of the scroll element of the scrollbar displayed on the GUI; and
setting a first marker within the available content at a first focus location associated with the available content displayed within the GUI.

7. The computer-implemented method of claim 6, further comprising:
detecting a second lateral sliding user interaction along the display surface of the multitouch input display device approximately perpendicular to the at least one of the two simultaneous sliding user interactions proximate to the display location of the scroll element of the scrollbar displayed on the GUI; and
setting a second marker within the available content at a second focus location associated with the available content displayed within the GUI; and
highlighting a portion of the available content between the first marker and the second marker for display.

8. A system, comprising:
a multitouch input display device adapted to display visual information to a user and provide user input via user contact on a display surface; and
a processor programmed to:
detect two simultaneous sliding user interactions along the display surface of the multitouch input display device axially directed relative to a length of a scrollbar and each proximate to a display location of one of first and second edges of a displayed scroll element of the scrollbar displayed on a graphical user interface (GUI) of the device;
concurrently determine:
whether the detected two simultaneous sliding user interactions result in a difference in relative spacing between initial user display contact locations and resulting user display contact locations; and
whether the detected two simultaneous sliding user interactions also represent movement in similar axial directions axially relative to the length of the scrollbar;
automatically zoom available content displayed within the GUI in proportion to any determined difference in the relative spacing between the initial user display contact locations and the resulting user display contact locations, where a detected pinching motion of the detected two simultaneous sliding user interactions closer together zooms in and enlarges a size of displayed portions of the available content and a detected stretching motion of the detected two simultaneous sliding user interactions further apart zooms out and reduces the size of the displayed portions of the available content; and
concurrently scroll the available content in proportion to any determined movement of a center of the scrollbar in the similar axial directions axially relative to the length of the scrollbar.

9. The system of claim 8, where, in being programmed to detect the two simultaneous sliding user interactions along the display surface of the multitouch input display device axially directed relative to the length of the scrollbar and each proximate to the display location of one of the first and second edges of the displayed scroll element of the scrollbar displayed on the GUI of the device, the processor is programmed to:
detect that the user has contacted the display surface of the multitouch input display device at first and second user contact locations that each approximate a display location for one of the first and second edges of the displayed scroll element of the scrollbar respectively; and
detect a first and second simultaneous sliding movement axially relative to the length of the scrollbar in approximately opposite directions, associated with the first and second user contact locations respectively, along the display surface to third and fourth user contact locations.

10. The system of claim 9, where, in being programmed to automatically zoom the available content displayed within the GUI, the processor is programmed to:
calculate a first spacing distance between the first and second user contact locations;
calculate a second spacing distance between the third and fourth user contact locations;
calculate a proportional difference between the first spacing distance and the second spacing distance relative to a quantity of the available content; and
automatically adjust a displayed portion of the available content based upon the calculated proportional difference.

11. The system of claim 8, where the processor is further programmed to automatically adjust a size of the displayed scroll element in proportion to the automated zooming of the available content displayed within the GUI.

12. The system of claim 8, where, in being programmed to detect the two simultaneous sliding user interactions along the display surface of the multitouch input display device axially directed relative to the length of the scrollbar and each proximate to the display location of one of the first and second edges of the displayed scroll element of the scrollbar displayed on the GUI of the device, the processor is programmed to:

detect two approximately axially-oriented simultaneous sliding user interactions along the display surface relative to an axis of movement of the displayed scroll element within the displayed scrollbar; and automatically adjust a size of the displayed scroll element axially within the displayed scrollbar in proportion to the automated zooming of the available content displayed within the GUI.

13. The system of claim 8, where the processor is further programmed to:

detect a first lateral sliding user interaction along the display surface of the multitouch input display device approximately perpendicular to the relative axial direction associated with at least one of the two simultaneous sliding user interactions proximate to the display location of the scroll element of the scrollbar displayed on the GUI; and set a first marker within the available content at a first focus location associated with the available content displayed within the GUI.

14. The system of claim 13, where the processor is further programmed to:

detect a second lateral sliding user interaction along the display surface of the multitouch input display device approximately perpendicular to the relative axial direction associated with the at least one of the two simultaneous sliding user interactions proximate to the display location of the scroll element of the scrollbar displayed on the GUI; and set a second marker within the available content at a second focus location associated with the available content displayed within the GUI; and highlight a portion of the available content between the first marker and the second marker for display.

15. A system, comprising:

a multitouch input display device adapted to display visual information to a user and provide user input via user contact on a display surface; and a processor programmed to:

detect that the user has contacted the display surface of the multitouch input display device at first and second user contact locations that each approximate a display location for one of first and second edges of a displayed scroll element respectively, of a scrollbar displayed within a graphical user interface (GUI);

detect first and second simultaneous sliding user interactions along the display surface of the multitouch input display device axially relative to a length of the scrollbar and each proximate to the display location of one of the first and second edges of the displayed scroll element of the scrollbar, associated with the first and second user contact locations respectively, to third and fourth user contact locations;

calculate a first spacing distance between the first and second user contact locations;

calculate a second spacing distance between the third and fourth user contact locations;

calculate a proportional difference between the first spacing distance and the second spacing distance relative to a quantity of the available content;

determine whether the detected first and second simultaneous sliding user interactions also represent movement in similar axial directions axially relative to the length of the scrollbar;

automatically zoom available content displayed within the GUI based upon the calculated proportional difference, where a detected pinching motion of the first and second simultaneous sliding user interactions closer together zooms in the available content and a detected stretching motion of the detected first and second simultaneous sliding user interactions further apart zooms out the available content;

concurrently scroll the available content in proportion to any determined movement of a center of the scrollbar in the similar axial directions axially relative to the length of the scrollbar; and automatically adjust a size of the displayed scroll element in proportion to the automated adjustment of the displayed portion of the available content displayed within the GUI.

16. A computer program product comprising a computer useable storage device including a computer readable program, wherein the computer readable program when executed on a computer causes the computer to:

detect two simultaneous sliding user interactions along a display surface of a multitouch input display device axially relative to a length of a scrollbar and each proximate to a display location of one of first and second edges of a displayed scroll element of the scrollbar displayed on a graphical user interface (GUI) of the device;

concurrently determine:

whether the detected two simultaneous sliding user interactions result in a difference in spacing between initial and resulting user display contact locations; and whether the detected two simultaneous sliding user interactions also represent movement in similar axial directions axially relative to the length of the scrollbar;

automatically zoom available content displayed within the GUI in proportion to any determined difference in the relative spacing between the initial user display contact locations and the resulting user display contact locations, where a detected pinching motion of the detected two simultaneous sliding user interactions closer together zooms in and enlarges a size of displayed portions of the available content and a detected stretching motion of the detected two simultaneous sliding user interactions further apart zooms out and reduces the size of the displayed portions of the available content; and concurrently scroll the available content in proportion to any determined movement of a center of the scrollbar in the similar axial directions axially relative to the length of the scrollbar.

17. The computer program product of claim 16, where, in causing the computer to detect the two simultaneous sliding user interactions along the display surface of the multitouch input display device axially directed relative to the length of the scrollbar and each proximate to the display location of one of the first and second edges of the displayed scroll element of the scrollbar displayed on the GUI of the device, the computer readable program when executed on the computer causes the computer to:

detect that a user has contacted the display surface of the multitouch input display device at first and second user contact locations that each approximate a display location for one of the first and second edges of the displayed scroll element of the scrollbar respectively; and detect a first and second simultaneous sliding movement axially relative to the length of the scrollbar in approximately opposite directions, associated with the first and second user contact locations respectively, along the display surface to third and fourth user contact locations.

18. The computer program product of claim 17, where, in causing the computer to automatically zoom the available content displayed within the GUI, the computer readable program when executed on the computer causes the computer to:

calculate a first spacing distance between the first and second user contact locations;

calculate a second spacing distance between the third and fourth user contact locations;

calculate a proportional difference between the first spacing distance and the second spacing distance relative to a quantity of the available content; and automatically adjust a displayed portion of the available content based upon the calculated proportional difference.

19. The computer program product of claim 16, where the computer readable program when executed on a computer further causes the computer to automatically adjust a size of the displayed scroll element in proportion to the automated zooming of the available content displayed within the GUI.

20. The computer program product of claim 16, where, in causing the computer to detect the two simultaneous sliding user interactions along the display surface of the multitouch input display device axially directed relative to the length of the scrollbar and each proximate to the display location of one of the first and second edges of the displayed scroll element of the scrollbar displayed on the GUI of the device, the computer readable program when executed on the computer causes the computer to:

detect two approximately axially-oriented simultaneous sliding user interactions along the display surface relative to an axis of movement of the displayed scroll element within the displayed scrollbar; and automatically adjust a size of the displayed scroll element axially within the displayed scrollbar in proportion to the automated zooming of the available content displayed within the GUI.

21. The computer program product of claim 16, where the computer readable program when executed on the computer further causes the computer to:

detect a first lateral sliding user interaction along the display surface of the multitouch input display device approximately perpendicular to at least one of the two simultaneous sliding user interactions proximate to the display location of the scroll element of the scrollbar displayed on the GUI; and set a first marker within the available content at a first focus location associated with the available content displayed within the GUI.

22. The computer program product of claim 21, where the computer readable program when executed on the computer further causes the computer to:

detect a second lateral sliding user interaction along the display surface of the multitouch input display device approximately perpendicular to the at least one of the two simultaneous sliding user interactions proximate to the display location of the scroll element of the scrollbar displayed on the GUI; and set a second marker within the available content at a second focus location associated with the available content displayed within the GUI; and highlight a portion of the available content between the first marker and the second marker for display.

* * * * *